Feb. 3, 1931.  S. G. AVERELL  1,791,110

SPRING SCALE

Filed June 6, 1929

INVENTOR
Sylvester G. Averell,
BY Henry M. Bingham
his ATTORNEY

Patented Feb. 3, 1931

1,791,110

UNITED STATES PATENT OFFICE

SYLVESTER G. AVERELL, OF NEW YORK, N. Y., ASSIGNOR TO JOHN CHATILLON & SONS, OF NEW YORK, N. Y., A CORPORATION OF NEW YORK

SPRING SCALE

Application filed June 6, 1929. Serial No. 368,854.

This invention relates to spring scales, and more particularly to a novel improvement in scales of the indicating or reading type.

The indicators on spring scales as heretofore made have inaccurately registered the weight because of longitudinal expansion or contraction of the spring material and to changes in the stiffness of the springs due to changes in temperature. These causes have resulted in the multiplication of error in the reading of the scale and are therefore objectionable.

The primary object of the present invention is to provide a simple, practical and reliable means for accurately correcting the error of the indicator for longitudinal expansion or contraction of the spring material due to changes in temperature and for substantially compensating for the error in the reading of the indicator due to changes in the stiffness of the springs due to temperature changes.

In my co-pending application Serial No. 368,852 filed of even date herewith, I have shown one way of meeting the above indicated problem, namely, by using a compensating rack, and in the present case I show another way of accomplishing the same results, namely, by using a scale having a higher co-efficient of expansion than the spring material, and so arranged and mounted that it will always be readily responsive to changes in temperature.

With the above and other objects in view which will more readily appear as the nature of the invention is better understood, the same consists in the novel construction, combination and arrangement of parts hereinafter more fully described, illustrated and claimed.

A preferred and practical illustration of the invention is shown in the accompanying drawings in which:—

Similar reference characters designate corresponding parts throughout the several figures of the drawings.

Figure 1:
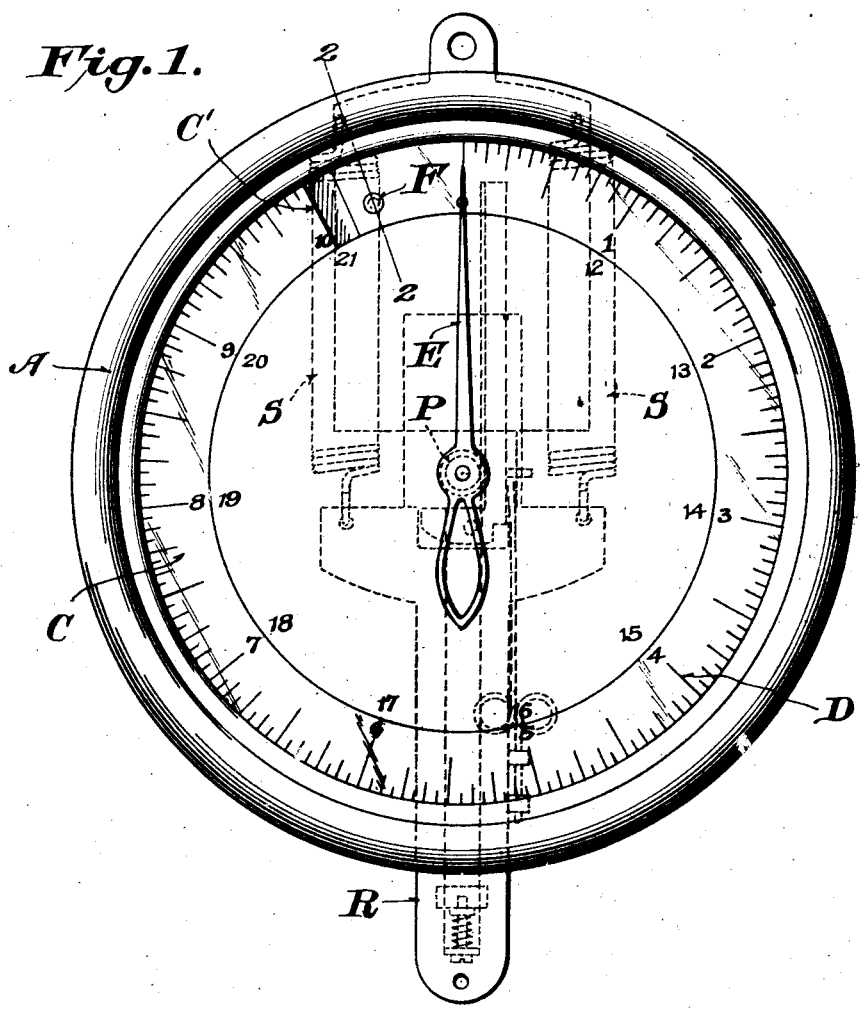
Figure 1 is a front elevation of the improved construction.
Figure 2:
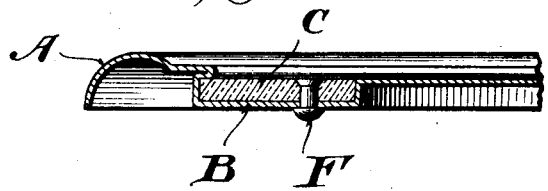
Fig. 2 is a detail cross-sectional view taken on the line 2—2 of Fig. 1.

According to the embodiment of the invention shown in the drawings, the same includes in its organization a suitable face plate A, the same having formed therein a groove or guideway B of annular formation and adapted to receive therein a scale member C. This scale member is provided with suitable calibrations D which cooperate with the indicator E to register the load imposed on the runner R of the scale.

The scale member C may assume the various forms, for example, a split ring when used in conjunction with a dial type of scale, or as will be quite apparent, if used in connection with a drum type scale, may assume the form of a split band, or a straight strip where the indicator has a sliding movement. In either case, however, the scale member C is made of a material having such a higher co-efficient of expansion than the material of which the springs S are made, that under varying changes in temperature it will expand to such a degree that the indicating mechanism will correctly indicate zero and any load on the scale.

The scale member C must be anchored or held in such a way as to maintain a normal zero point under varying temperatures. I accomplish this result in the embodiment shown by fastening or securing the scale member to the bottom wall of the guideway B by the fastening F, at such a distance from zero on the scale member on the negative or minus end that the expansion or contraction of the scale member between the point of fastening and zero will maintain the zero mark in alignment with the indicator under all variation of temperature when the scale is not under load.

I also so construct my spring or springs that the flex will coordinate with the indicating mechanism and that the length of the spring material will be such that the expansion or contraction of the scale under changes of temperature will cause the indicating mechanism to register the correct weight of the load on the scale under all temperature and load conditions. The contraction and expansion of the scale member are such as to substantially compensate for the changing flexibility of scale springs due to changes of temperature.

To permit of the expansion of the calibrated member C under maximum temperature conditions, the same terminates as indicated at C'. This provides a space affording ample clearance for the movement of the scale member under all conditions of use. The entire movement of the member C under varying temperature conditions is guided by the groove or guideway B formed in the plate A so that at all times the expansion will manifest itself in the correct direction for giving the proper reading of the indicator on the scale. Furthermore, this arrangement prevents distortion of the member C from its circular form thereby preserving and prolonging its original characteristics and maintaining it in correct spaced relation to indicator E.

As the temperature varies and the material of the springs S expands or contracts the runner R which carries the rack R' which meshes with the pinion P on the indicator shaft will cause the indicator to move, but due to the expansion of the material of the member C, the zero point will always be moved a like distance and in the same direction so that the indicator will always register with zero on the scale under no load conditions and when a load is imposed the expansion or contraction of the member C will always substantially compensate for error in the reading of the indicator due to changes in the stiffness of the springs under all load and temperature conditions.

A suitable material for the member C is acetate sheet stock manufactured by the Celluloid Company of America.

From the foregoing it will be apparent that the present invention carries forward the theory of my co-pending application referred to, namely, that of providing a single member for automatically correcting the errors in spring scales caused by longitudinal expansion or contraction of the spring material and substantially compensating for errors due to variations in the stiffness of the springs due to temperature changes.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a spring balance scale the combination with a movable indicator, responsive to spring length and flexure, of a guideway and a calibrated member mounted therein having a higher co-efficient of expansion than steel, secured at such a point on the negative side of zero as will cause the zero point to register with the indicator under all variations of temperature when the scale is not under load.

2. In a spring balance scale the combination with a movable indicator, responsive to spring length and flexure, of a guideway and a divided calibrated member mounted therein having a higher co-efficient of expansion than steel, secured at such a point on the negative side of zero as will cause the zero point to register with the indicator under all variations of temperature when the scale is not under load.

3. In a spring balance scale the combination with an indicator, responsive to spring length and flexure, of a guideway and a calibrated member mounted therein in said guideway and having a higher co-efficient of expansion than steel, secured at such a point on the negative side of zero as will cause the zero point to register with the indicator under all variations of temperature when the scale is not under load.

4. In a spring balance scale the combination of an indicator, responsive to spring length and flexure, with a guideway and a calibrated member mounted therein secured at such a point on the negative side of zero and having such a higher co-efficient of expansion than the material of the spring that the indicator and calibrated member will co-operate to register zero at no load and substantially compensate for errors of the indicator due to changes in temperature under all load and temperature conditions.

5. In a spring balance scale, the combination with a movable indicator, responsive to elongation and flexure of the spring, of a guideway and a calibrated split ring mounted therein having a higher co-efficient of expansion than the material of the springs, and secured on the negative side of the zero calibration at such a distance therefrom as will cause the expansion of said member to correct the zero reading when the scale is not under load.

6. A spring balance scale including in combination, a member having a guideway, a movable indicator, responsive to elongation and flexure, of the spring of the scale, with a scale member having calibrations thereon and arranged in said guideway, said scale member having a higher co-efficient of expansion than the material of the spring, and means for securing the scale member to said first-mentioned member on the negative side of the zero calibration at such a distance as will cause the expansion of said member to correct the zero indication at all temperatures when the scale is not under load.

7. A spring balance scale including in combination, a member having a guideway, a movable indicator, responsive to elongation and flexure, of the spring of the scale, with a divided scale member having calibrations thereon and arranged in said guideway, said scale member having a higher co-efficient of expansion than the material of the springs, and means for securing the scale member to said first-mentioned member on the negative side of the zero calibration at such a distance as will cause the expansion of said member to correct the zero indication at all temperatures when the scale is not under load.

8. In a spring balance scale, the combination with a movable indicator, responsive to spring length and load flexure of the spring, of a calibrated member having such a higher co-efficient of expansion than the material of the springs of the scale, and anchored at such a point on the negative side of the zero calibration that under varying temperatures and load conditions the calibrated member will automatically correct the errors in the reading of the scale due to changes in length of the wire of the spring and substantially compensate for the errors in the reading of the indicator due to changes in the stiffness of the springs due to changes in temperature.

9. In a spring balance scale, the combination with a movable indicator, responsive to length and flexure of the spring, of a guideway and a divided calibrated member mounted therein having such a higher co-efficient of expansion than the material of the spring of the scale, and anchored at such a point on the negative side of the zero calibration that under varying temperatures and load conditions the calibrated member will automatically correct the reading of the scale to compensate for the changes in length of the wire of the spring and substantially compensate for errors due to the changes in the stiffness of the springs due to changes in temperature.

10. In a spring balance scale, the combination of an indicator actuated in a constant responsive relation to the length and flexure of a guideway and the spring with a calibrated member mounted therein having such a higher co-efficient of expansion than the material of the spring and secured at such a point on the negative side of zero and a spring of such gauge of wire, diameter of coil and length that the indicating mechanism will register with zero under no load on the scale and substantially compensate for errors in the scale reading due to changes in the stiffness of the springs under all temperatures and load conditions.

Signed at New York city, in the county of New York and State of New York this 27th day of May, A. D. 1929.

SYLVESTER G. AVERELL.